(12) United States Patent
Cover et al.

(10) Patent No.: US 12,656,264 B2
(45) Date of Patent: Jun. 16, 2026

(54) SYSTEMS AND METHODS FOR IDENTIFYING WAVEGUIDE DEFECTS

(71) Applicant: VIASAT, INC., Carlsbad, CA (US)

(72) Inventors: Matthew Cover, Chandler, AZ (US); Justin M. Hallas, San Marcos, CA (US)

(73) Assignee: VIASAT, INC., Carlsbad, CA (US)

( * ) Notice: Subject to any disclaimer, the term of this patent is extended or adjusted under 35 U.S.C. 154(b) by 640 days.

(21) Appl. No.: 17/966,952

(22) Filed: Oct. 17, 2022

(65) Prior Publication Data

US 2024/0125708 A1 Apr. 18, 2024

(51) Int. Cl.
*G01N 21/88* (2006.01)

(52) U.S. Cl.
CPC ................................. *G01N 21/8806* (2013.01)

(58) Field of Classification Search
CPC .................................................. G01N 21/8806
See application file for complete search history.

(56) References Cited

U.S. PATENT DOCUMENTS

| | | | |
|---|---|---|---|
| 9,973,940 B1 | 5/2018 | Rappaport | |
| 10,372,117 B2 | 8/2019 | Willett et al. | |
| 2003/0120714 A1* | 6/2003 | Wolff ...................... | G06F 18/40 709/200 |
| 2007/0098245 A1* | 5/2007 | Mylaraswamy ...... | G06T 7/0004 382/199 |

FOREIGN PATENT DOCUMENTS

| | | |
|---|---|---|
| CN | 106908456 B | 6/2017 |
| CN | 207798707 U | 8/2018 |
| CN | 112184635 A | 1/2021 |
| CN | 113392915 A | 9/2021 |
| CN | 114140440 A | 3/2022 |
| JP | 2007022651 A | 2/2007 |
| KR | 20090116441 A | 11/2009 |

OTHER PUBLICATIONS

NPL: Results Publication Date Range: Apr. 2, 1992 to Jun. 24, 2025.*
International Search Report and Written Opinion issued Jan. 16, 2024, in PCT/US2023/033293, 13 pages.
Rippa et al., "Infrared image analysis as a new experimental approach for measuring waveguide losses," Meas. Sci. Technol. 20 (2009) 095706 (5pp).
Ebayyeh et al., "Waveguide quality inspection in quantum cascade lasers: A capsule neural network approach," Expert Systems With Applications 210 (2022) 118421, 12 pages.

* cited by examiner

*Primary Examiner* — Quang N Vo
(74) *Attorney, Agent, or Firm* — Vorys, Sater, Seymour and Pease, LLP; Michael Messinger

(57) ABSTRACT

Systems and methods are described herein for waveguide defect detection. In some examples, a statistical value of pixels of a number of image locations in one or more images of the waveguide can be computed. An extremity matrix can be generated based on an anomaly detector model and statistical pixel data that includes statistical values computed for respective image locations in the one or more images of the waveguide. A decision can be made to determine whether the waveguide is a conforming or a non-conforming waveguide based on the extremity matrix and a set of thresholds. In some examples, the statistical value is a mean intensity value or an average intensity value.

20 Claims, 12 Drawing Sheets

100 ⟶

100

200

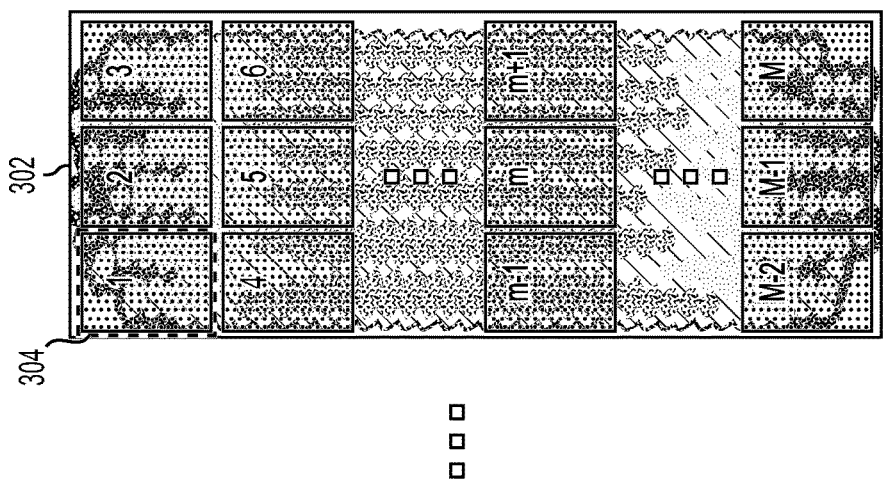
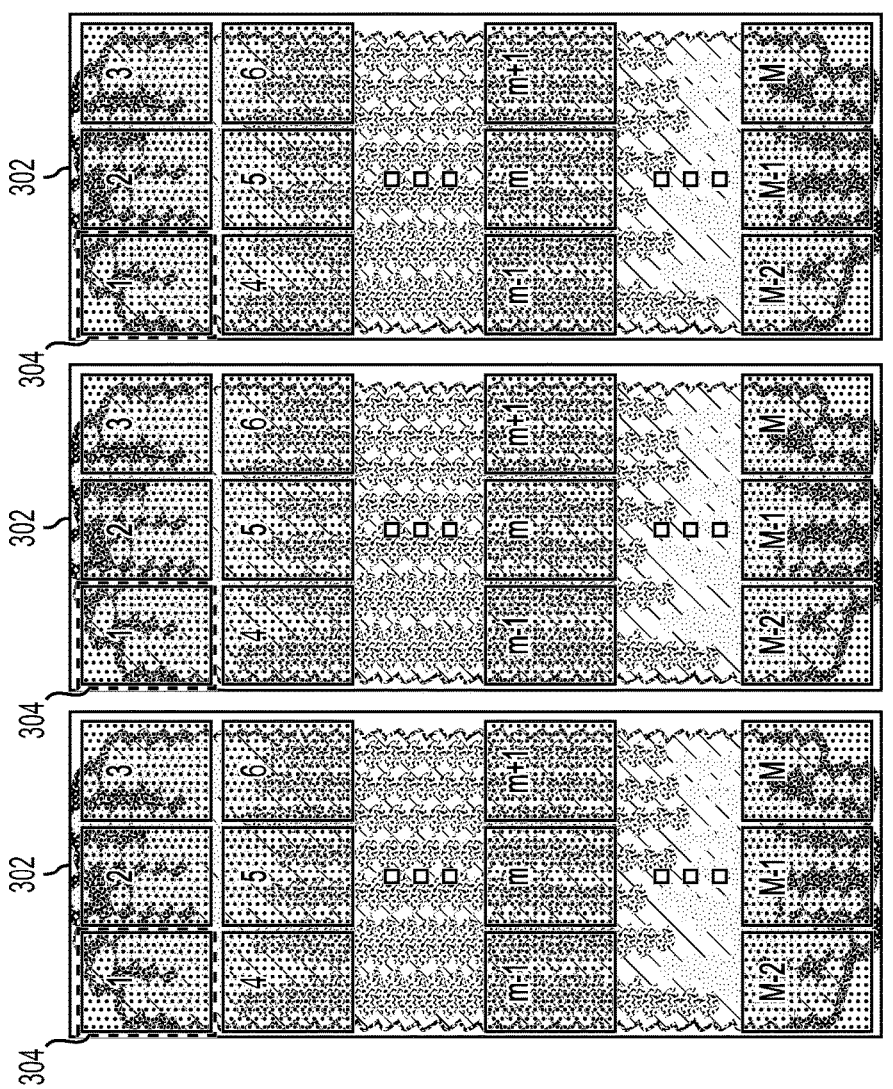
*FIG. 3*

500

600

800

900

1000 ⟶

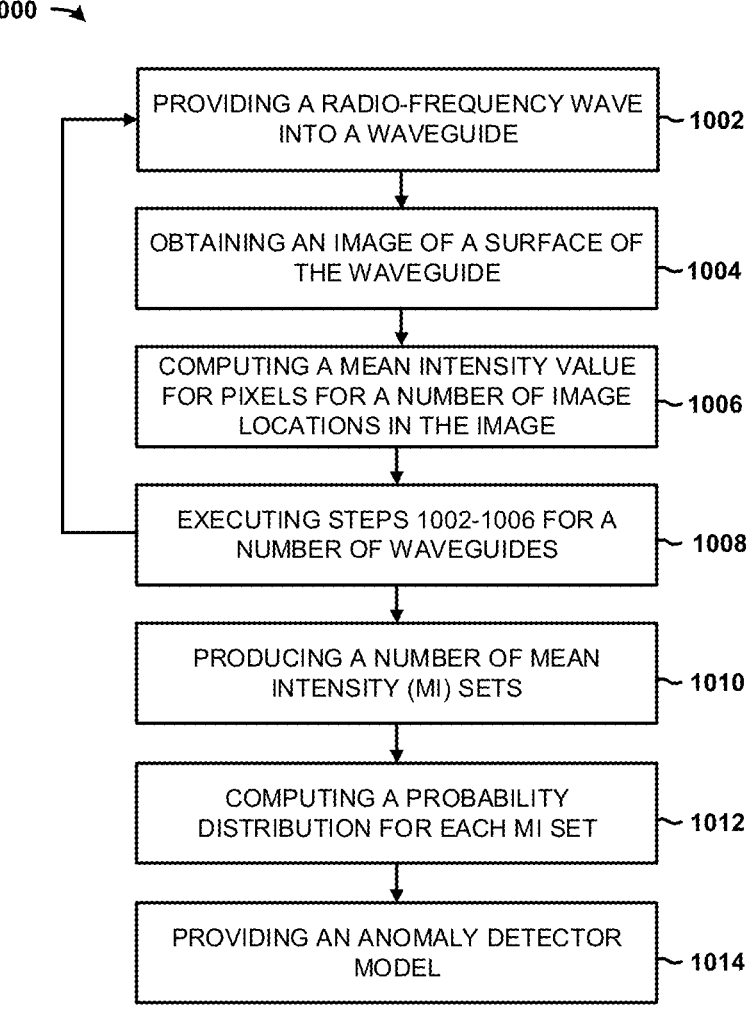

PROVIDING A RADIO-FREQUENCY WAVE INTO A WAVEGUIDE ~1002

OBTAINING AN IMAGE OF A SURFACE OF THE WAVEGUIDE ~1004

COMPUTING A MEAN INTENSITY VALUE FOR PIXELS FOR A NUMBER OF IMAGE LOCATIONS IN THE IMAGE ~1006

EXECUTING STEPS 1002-1006 FOR A NUMBER OF WAVEGUIDES ~1008

PRODUCING A NUMBER OF MEAN INTENSITY (MI) SETS ~1010

COMPUTING A PROBABILITY DISTRIBUTION FOR EACH MI SET ~1012

PROVIDING AN ANOMALY DETECTOR MODEL ~1014

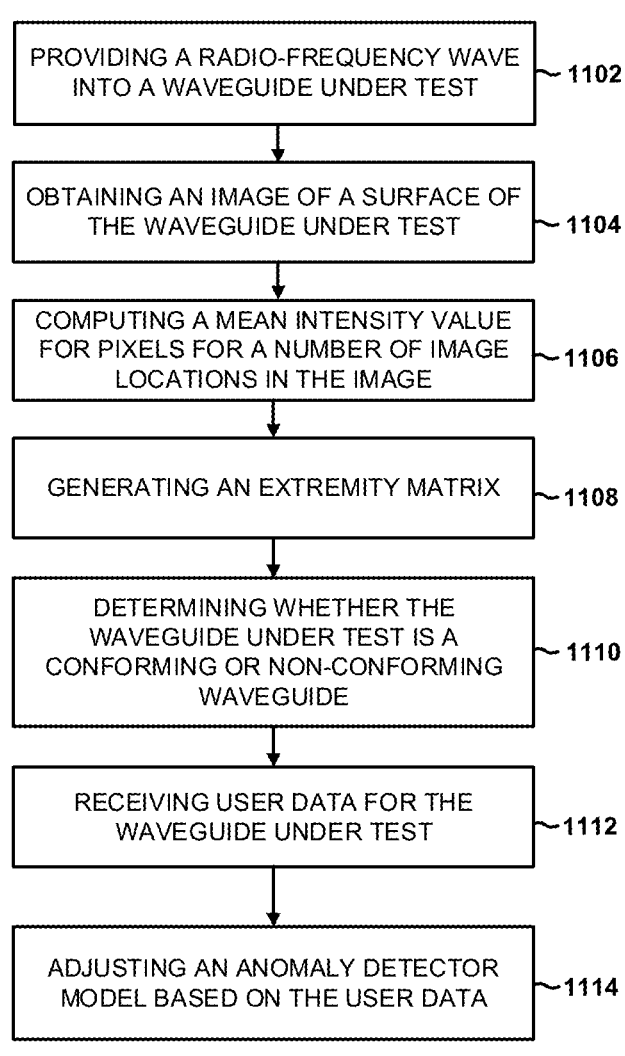

PROVIDING A RADIO-FREQUENCY WAVE INTO A WAVEGUIDE UNDER TEST ~1102

OBTAINING AN IMAGE OF A SURFACE OF THE WAVEGUIDE UNDER TEST ~1104

COMPUTING A MEAN INTENSITY VALUE FOR PIXELS FOR A NUMBER OF IMAGE LOCATIONS IN THE IMAGE ~1106

GENERATING AN EXTREMITY MATRIX ~1108

DETERMINING WHETHER THE WAVEGUIDE UNDER TEST IS A CONFORMING OR NON-CONFORMING WAVEGUIDE ~1110

RECEIVING USER DATA FOR THE WAVEGUIDE UNDER TEST ~1112

ADJUSTING AN ANOMALY DETECTOR MODEL BASED ON THE USER DATA ~1114

FIG. 11

SYSTEMS AND METHODS FOR IDENTIFYING WAVEGUIDE DEFECTS

TECHNICAL FIELD

This disclosure relates generally to waveguides, and more particularly, to detecting defects in waveguides, for example, during manufacturing.

BACKGROUND

A waveguide is a structure that guides waves with minimal loss of energy by restricting a transmission of energy to one direction. Waveguides for radio frequency (RF) applications can be constructed to carry radio waves. RF waveguides can be used as transmission lines, for example, at microwave frequencies, for such purposes such as connecting microwave transmitters and receivers to respective antennas, and in equipment such as microwave ovens, radar sets, satellite communications, and microwave radio links.

SUMMARY

In embodiments, computer-implemented methods, systems and devices for identifying waveguide defects are provided.

In an embodiment, a computer-implemented method can include receiving image data that can include one or more images of a waveguide, computing a statistical value of pixels of a number of image locations in the one or more images of the waveguide, generating an extremity matrix based on an anomaly detector model and statistical pixel data that can include statistical values computed for respective image locations in the one or more images of the waveguide, and determining whether the waveguide is a conforming or a non-conforming waveguide based on the extremity matrix and a set of thresholds.

In another embodiment, a system can include memory to store machine-readable instructions and data that can include an anomaly detector model comprising pre-computed probability distributions and one or more processors to access the memory and execute the machine-readable instructions. The machine-readable instructions can include a statistical calculator, a deviation calculator, and a decision function. The statistical calculator can be programmed to compute a statistical value of pixels of each image location in one or more images of a waveguide. The deviation calculator can be programmed to generate an extremity matrix based on an evaluation of the statistical value of the pixels of each image location in the one or more images of the waveguide and a respective one of the pre-computed probability distributions. The decision function can be programmed to determine whether the waveguide is a conforming or a non-conforming waveguide based on the extremity matrix and a set of thresholds.

In a further embodiment, a computer-implemented method can include receiving one or more images of a conforming electronic device, computing a mean intensity value (MIV) of pixels of each image location in the one or more images of the conforming electronic device, and repeating the receiving and the computing step for a number of conforming electronic devices to compute respective MIVs of pixels of image locations in one or more images of the conforming electronic devices. The method can further include generating MI sets based on respective image location values for the image locations across the one or more images of the conforming electronic devices, and computing a respective probability distribution based on a respective MI set of the MI sets to provide probability distributions to form an anomaly detector model for detecting potential defects in one or more electronic devices.

Further embodiments, features, and advantages of the invention, as well as the structure and operation of the various embodiments of the invention are described in detail below with reference to accompanying drawings.

BRIEF DESCRIPTION OF THE DRAWINGS

Embodiments are described with reference to the accompanying drawings. In the drawings, like reference numbers may indicate identical or functionally similar elements. The drawing in which an element first appears is generally indicated by the left-most digit in the corresponding reference number.

FIG. 3 shows an example of a set of infrared (IR) images.

FIG. 10 is a flowchart diagram of a method for generating an anomaly detector model according to an embodiment.

FIG. 11 is a flowchart diagram of a method for determining whether a waveguide is a conforming or a non-conforming waveguide and updating an anomaly detector model according to an embodiment.

DETAILED DESCRIPTION

Figure 1:
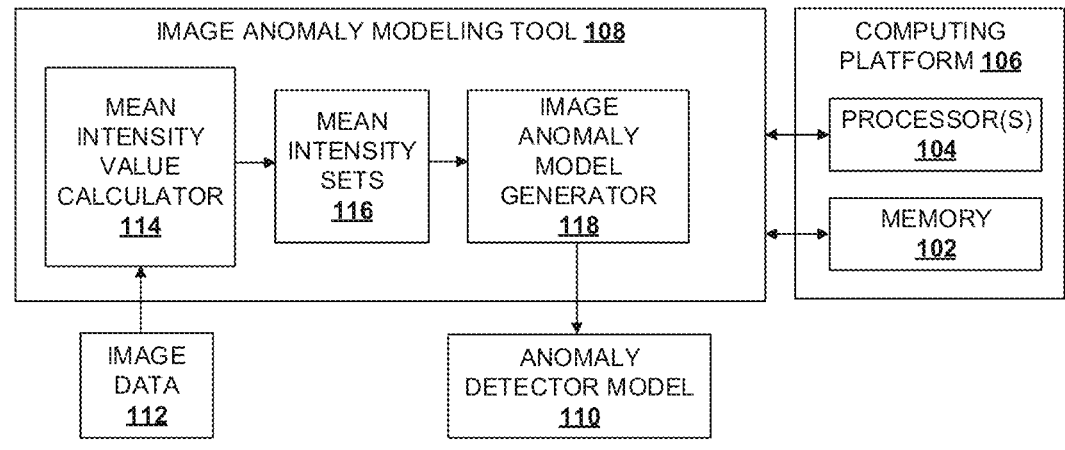
FIG. 1 is diagram of a system for generating an anomaly detector model according to an embodiment.

During waveguide manufacturing, waveguides are evaluated by a human to determine whether a waveguide contains any defects (e.g., abnormalities), and thus are prone to human error, and bottleneck a waveguide evaluation process (e.g., as only a limited number of personnel is available to perform waveguide evaluation). A waveguide evaluator is described herein that can be used during waveguide evaluation for defects that eliminates or reduces a need for human intervention (e.g., review of waveguides) and improves waveguide production throughput (e.g., improves a waveguide production cycle time).

In some examples, the waveguide evaluator receives one or more images of a waveguide under test. A waveguide under test corresponds to a waveguide that is being tested for defects to determine whether the waveguide is a conforming waveguide (e.g., has no defects, or a number of acceptable defects), or a non-conforming waveguide (e.g., has defects, or a non-acceptable number of defects). The one or more images can be provided by an infra-red (IR) sensor in response to a test driver injecting a radio-frequency (RF) test signal into the waveguide under test. The one or more images can include a surface of the waveguide under test and capture an RF profile (e.g., the electro-magnetic power vs. position) at the surface of the waveguide.

A statistical calculator of the waveguide evaluator can compute a statistical value of pixels of a number of image locations in the one or more images of the waveguide under test. In some examples, the statistical calculator is a MIV calculator and a MIV value of pixels of the number of image locations is computed. In other examples, the statistical calculator is an average intensity value (AIV) calculator, and an AIV value of pixels of the number of image locations is computed. The statistical calculator can provide statistical pixel data to a deviation calculator of the waveguide evaluator, which can also receive an anomaly detector model.

The anomaly detector model can be generated by an image anomaly modeling tool. The image anomaly modeling tool can receive images of a number of conforming waveguides and use the received images to generate the anomaly detector model. The anomaly detector model includes probability distributions for image locations across the images of the conforming waveguides. In further examples, the waveguide evaluator includes a deviation calculator that can compute an extremity matrix based on the anomaly detector model and the statistical pixel data. The extremity matrix can include a number of deviation values, each corresponding to a deviation of one of statistical values determined for an image location of the image locations in each image of the waveguide under test from a median of a corresponding continuous probability distribution (e.g., fitted CPD) of the anomaly detector model.

In some examples, the waveguide evaluator includes a decision function that can determine whether the waveguide under test is a conforming or non-conforming waveguide based on the extremity matrix and a set of thresholds (e.g., a set of values). In some examples, the decision function receives user data confirming that the waveguide under test is a conforming or non-conforming waveguide. The decision function can adjust the anomaly detector model based on the user data, for example, by updating one or more probability distributions of the anomaly detector model. Accordingly, the waveguide evaluator can be used during manufacturing or production to determine whether waveguides, such as RF waveguides, are conforming or non-conforming.

FIG. 1 is an example of a system 100 for image anomaly model generation. In some examples, the system 100 can include memory 102 for storing machined readable instructions and data and one or more processors 104 for accessing the memory 102 and executing the machine-readable instructions. The memory 102 can represent a non-transitory machine-readable memory (or other medium), such as random access memory (RAM), a solid state drive, a hard disk drive, or a combination thereof. The one or more processors 104 can be implemented as one or more processor cores. In some examples, the system 100 includes a computing platform 106, which includes the memory 102 and the one or more processors 104. The computing platform 106 could be implemented in a computing cloud and on one or more servers including a server farm or cluster of servers. In such a situation, features of the computing platform 106, such as the one or more processors 104 and the memory 102 could be representative of a single instance of hardware or multiple instances of hardware with applications executing across the multiple instances (e.g., distributed) of hardware (e.g., computers, routers, memory, processors, or a combination thereof). Alternatively, the computing platform 106 could be implemented on a single dedicated server or workstation.

As shown in FIG. 1, the system 100 includes an image anomaly modeling tool 108. In some examples, the image anomaly modeling tool 108 can be implemented as machine readable instructions that can be stored in the memory 102, as shown in FIG. 1. The image anomaly modeling tool 108 can be implemented using one or more modules, shown in block form in the drawings. The one or more modules can be in software or hardware form, or a combination thereof. According to the examples herein, the image anomaly modeling tool 108 can provide an anomaly detector model 110 for distinguishing between conforming and non-conforming electronic devices, such as waveguides. In some examples, the waveguides are RF waveguides. A conforming electronic device can refer to a baseline or reference electronic device that is free of unwanted defects. Otherwise, the electronic device can be considered non-conforming.

For example, the image anomaly modeling tool 108 can receive image data 112 that includes one or more infrared (IR) images of a device of under test (DUT). In some examples, the DUT is a waveguide, such as an RF waveguide, and can be referred to as a waveguide under test. In other examples, the DUT is a different type of electronic device (e.g., a circuit, a component, an integrated circuits (IC), a die, etc.) Examples are presented herein in which waveguide images are used by image anomaly modeling tool 108 for generating the anomaly detector model 110 for detecting defects in waveguides. However, the examples herein should not be construed and/or limited to waveguide defect detection, and can be used in other applications, for example, thermographic inspection of electronic devices. Thus, in some examples, the image anomaly modeling tool 108 can be programmed to provide an anomaly detector model for detection of anomalies in electronic device images corresponding to hotspots and/or atypical temperature distributions on a surface of a printed circuit board, IC, a multichip module, or a surface of another type of electronic device.

Continuing with the example of FIG. 1, the image data 112 can include one or more IR images of an outer surface of a number of conforming waveguides. In some example, the image anomaly modeling tool 108 (or another module) can pre-process the image data 112 to convert color pixels of the one or more IR images represented by the image data 112 to a matrix of RF amplitude values. In some examples, the matrix of RF amplitude values is scaled such that all values lie on a continuous interval from 0 to 255. The image anomaly modeling tool 108 can include a MIV calculator 114 to process the image data 112 to determine a MIV of pixels within a number of image locations in each IR image of the image data 112 of the conforming waveguides. For example, the MIV calculator 114 can divide each surface image of a respective conforming waveguide into image locations. A size of each image location can be user defined and thus in some instances image locations can have a rectangular dimension. In other instances, a different type of dimension can be used (e.g., a square dimension). While examples are described herein wherein the MIV calculator 114 determines the MIV of pixels for image locations, in other examples, the MIV calculator or an AIV calculator can be used to determine an AIV for the image locations. Thus, in some examples, the MIV of pixels within the number of image location in each IR image of the image data 112 can be the AIV of the pixels and the MIV calculator can be the AIV calculator.

The MIV calculator 114 can group pixels within each IR image into pixels groups to define an image location. The MIV calculator 114 can assign each image location in each of the IR images an image location value. For example, a respective image location can be assigned a similar given image location value (e.g., an integer value) across IR images. In some examples, the image locations in each image of the image data 112 can overlap such that a given percentage or a number of pixels are common to different image locations in a respective IR image. An amount of overlap (e.g., percentage or a number of pixels) can be user defined.

The MIV calculator 114 can produce a number of mean intensity (MI) sets 116 based on the image locations using assigned respective image location value for the image locations across IR images. In examples wherein the AIV calculator is used, the AIV calculator can produce a number of AI sets based the image locations using assigned respective image location value for the image locations across IR images. Each MI set of the MI sets 116 can include or identify the respective image location and a MIV for the respective image location across the IR images. In other examples, each AI set of the AI sets can include or identify the respective image location and an AIV for the respective image location across the IR images. For example, the MIV calculator 114 can group image locations across the IR images having a similar assigned given value to define or form a respective MI set of the MI sets 116. Thus, the MIV calculator 114 can produce the MI sets 116 that include or identify similar image locations across the IR images that have a similar assigned image location value. In some examples, the MI sets or AI sets can be referred to as statistical sets herein.

The image anomaly modeling tool 108 further can include an image anomaly model generator 118 which generates a probability distribution for each of the MI sets 116, or, in other examples each of the AI sets. Each probability distribution can also be associated (e.g., logically linked in the memory 102) with a given image location value. The given image location value can be associated with the respective MI set of the MI sets 116 that is used in generating a corresponding probability distribution. For example, the image anomaly model generator 118 can use distribution fitting and fit a distribution to each of the MI sets 116 to provide the corresponding probability distribution. The distribution can include a CPD, a kernel density estimation, or a scaled histogram. Thus, the image anomaly model generator 118 can provide a number of distributions (e.g., CPDs) based on one of the MI sets 116.

In some examples, the image anomaly model generator 118 can employ parameter estimation formulas to determine or identify best fit parameters (e.g., hyper parameters) for generating the probability distribution. Thus, the image anomaly model generator 118 can tune parameters of the distribution to best fit the distribution to a respective MI set of the MI sets 116 to provide the probability distribution. Once the best fit parameters have been identified for the distribution, the image anomaly model generator 118 in some instance can use similar best fit parameters for generation of probability distributions for remaining MI sets of the MI sets 116.

In some examples, a list of CPD names to include or exclude can be provided to the image anomaly model generator 118 to improve a speed at which the image anomaly model generator 118 generates probability distributions. For example, a list of known CPDs can be identified by the image anomaly model generator 118 from a repository of CPDs (e.g., in some instances stored in the memory 102, as shown in FIG. 1). The list of known CPDs can correspond to CPDs that best fit a statistical value (e.g., MIV or AIV), for example, based on root-mean-square deviation (RMSD), or the like. Because the list of known CPDs are CPDs that best fit the statistical value these CPDs improve a processing or computation time (e.g., speed up fitting time) of the processor 104 in contrast to other CPDs of the repository of the CPDs. The image anomaly model generator 118 can identify the list of known CPDs based on CPD identification data, which can be provided by a user, for example, at an input device, or from another system or software module. The CPD identification data can indicate whether a given CPD of the repository of CPDs is to be used or excluded for fitting use. An example of list of known CPDs can include normal, gamma, chi-squared, power normal, log normal, power log-normal, log-gamma, generalized-normal, and generalized-logistic distributions. In another or additional example, a list of CPDs that are identified as being excluded from fitting use by the CPD identification data can include beta, erlang, and arcsine distributions.

In additional examples, the image anomaly model generator 118 can apply a mask to exclude one or more of the probability distributions. For example, corners of each respective IR image can be excluded from evaluation. Variations at these parts of the image in some examples are not relevant for evaluating whether a waveguide is conforming or not, and including corner image locations can lead to misclassification as conforming or not. In some embodiments, the mask can be weighted so that one or more of the probability distributions is given greater or less consideration. In some examples, the weighting can be embedded in a set of thresholds, as described herein. Higher thresholds can be set for parts of the IR images where large variations from a CPD median (deviation) are less likely to indicate an anomaly exists than if a deviation of the same magnitude in another part of the IR image exists in an extremity matrix, such as described herein.

The image anomaly model generator 118 can output the anomaly detector model 110 based on each probability distribution computed for a respective one of the MI sets 116. In some instances, the image anomaly model generator 118 can group the probability distributions to provide the anomaly detector model 110. Thus, the anomaly detector model 110 can include each probability distribution generated for each MI set based on the image data 112. In some examples, the anomaly detector model 110 can include data or be associated with data identifying the given image location value associated with the respective MI set of the MI sets 116 used to provide a corresponding probability distribution. As described herein, the anomaly detector model 110 can be used by a waveguide evaluator for identifying anomalies in images of waveguides that can correspond to potential physical defects in the waveguides, existence of foreign object debris (FOD) on the waveguide, or waveguide testing setup misalignment (e.g., the sensor or waveguide are improperly positioned). Thus, the anomaly detector model 110 can be used in identifying non-conforming waveguides, as described herein.

Figure 2:
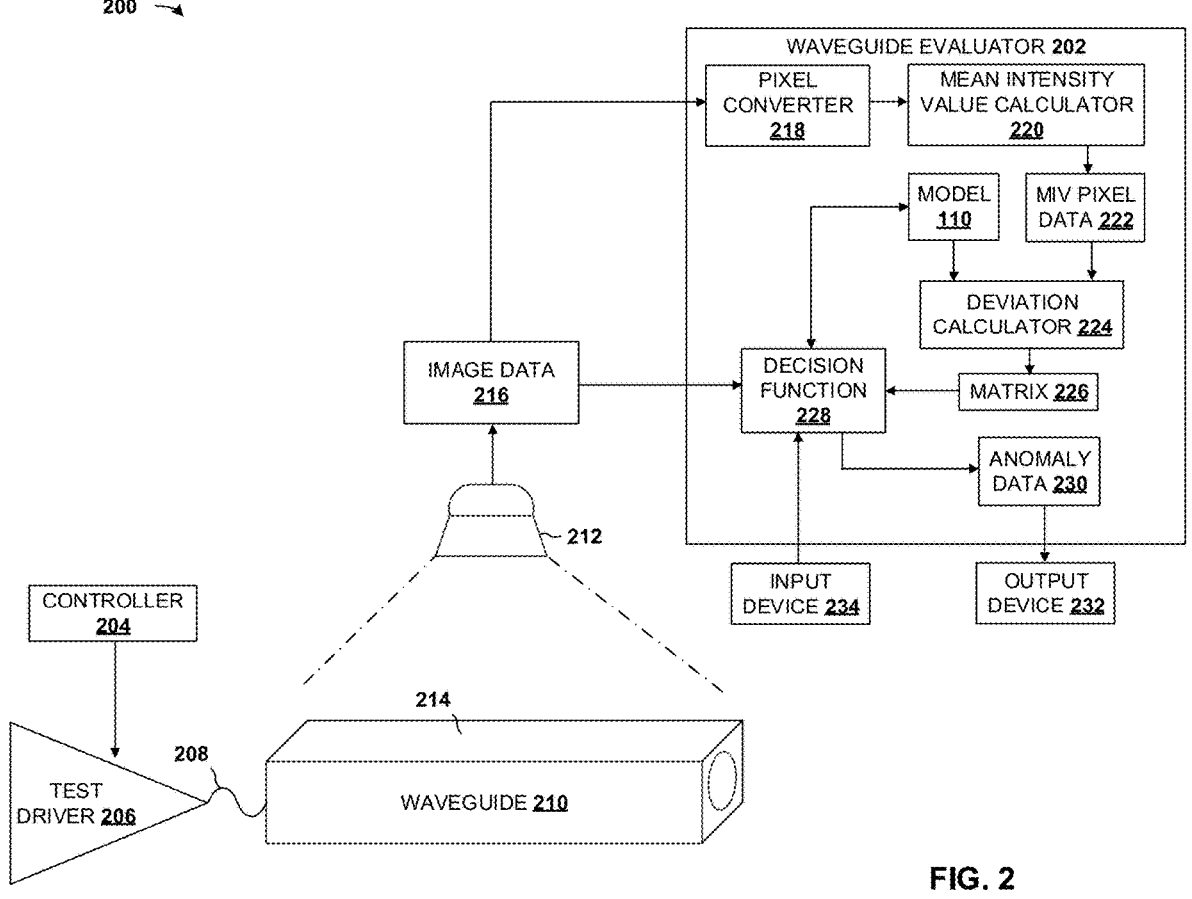
FIG. 2 is a diagram of system for determining whether a waveguide is a conforming or a non-conforming waveguide according to an embodiment.

FIG. 2 is an example of a system 200 that uses the anomaly detector model 110 to identify non-conforming waveguides, such as RF waveguides. Thus, reference can be made to the example of FIG. 1 in the example of FIG. 2. The system 200 includes a waveguide evaluator 202, which can be implemented on a computing platform, such as the computing platform 106, as shown in FIG. 1. In some examples, a waveguide evaluator 202 can be implemented as machine readable instructions that can be stored in memory (e.g., the memory 102, as shown in FIG. 1) and executed by a processor (e.g., by the one or more processors 104, as shown in FIG. 1). In some examples, the waveguide evaluator 202 can be implemented using one or more modules, shown in block form in the drawings. The one or more modules can be in software or hardware form, or a combination thereof. As described herein, the anomaly detector model 110 can be used to verify or confirm whether a waveguide is a conforming or non-conforming waveguide during production (e.g., screening of waveguides on a manufacturing line). In some examples, the system 200 can be referred to as a waveguide testing system. Thus, in some examples, the waveguide 210 can be referred to as a DUT (e.g., a waveguide under test).

The system 200 includes a controller 204 and a test driver 206. The controller 204 can cause the test driver 206 to output an RF test signal 208, which can be provided to a waveguide 210. The system 200 includes an IR sensor 212 to capture one or more IR images of a surface 214 of the waveguide 210. The IR sensor 212 can provide image data 216 that includes the one or more IR images of the waveguide 210. In some examples, referred to herein as "a given example," the test driver 206 can be used to provide the RF test signal 208 to a number of known conforming waveguides. In the given example, the IR sensor 212 can be used to capture one or more IR images of an outer surface of the conforming waveguides to provide the image data 112, as shown in FIG. 1. Thus, in the given example, portions of the system 200 can be used to provide the image data 112 of FIG. 1, which can be used by the image anomaly modeling tool 108 for generation of the anomaly detector model 110, as shown in FIGS. 1-2.

Continuing with the example of FIG. 2, in some instances, the image data 216 can be provided to a pixel converter 218. The pixel converter 218 can process the image data 216 to convert color pixels of the one or more IR images of the image data 216 to a matrix of RF amplitudes. In some examples, such as in the given example, the pixel converter 218 can be used to process the image data 112 to convert color pixels of the one or more IR images of the image data 112 to grey scale pixels. The processed image data can be provided to a MIV calculator 220. In some examples, pre-processing can be omitted, and the MIV calculator 220 can receive the image data 216, or can include the pixel converter 218.

The MIV calculator 220 can be implemented similar to the MIV calculator 114, as shown in FIG. 1. Thus, the MIV calculator 220 can process the image data 216 (or the processed image data from the pixel converter 218) to determine a MIV of pixels within a number of image locations in each IR image of the image data 216 for the waveguide 210. While examples are described herein wherein the MIV calculator 220 is used to determine the MIV of pixels within image locations, in other examples, the MIV calculator 220 or an AIV calculator can be used to determine an AIV of pixels within the image locations. The MIV calculator 220 can output MIV pixel data 222 characterizing the MIV of the pixels of each image location in each IR image of the image data 216. In some examples, the MIV calculator or the AIV calculator outputs AIV pixel data characterizing the AIV of the pixels of each image location in each IR image of the image data 216. The MIV calculator 220 can assign each image location in each IR image an image location value, and, in some examples, the MIV pixel data 222 can include the image location value for a respective image location in an IR image of the image data 216. In some examples, the image locations in each IR image of the image data 216 can overlap such that a given percentage or a number of pixels are common to different image locations in a respective IR image of the image data 216. An amount of overlap (e.g., percent or number of pixels) can be user defined.

The waveguide evaluator 202 can further include a deviation calculator 224 that can compute an extremity matrix 226 based on the anomaly detector model 110 and the MIV pixel data 222, in other examples, based on the AIV pixel data. The extremity matrix 226 can include a number of deviation values, each corresponding to a deviation of one of the MIVs determined for an image location of the image locations across IR images of the waveguide 210 from a median of a corresponding probability distribution (e.g., fitted CPD) of the anomaly detector model 110.

Continuing with the example of FIG. 2, the deviation calculator 224 can identify a respective image location in each IR image of the image data 216 and a respective probability distribution of the anomaly detector model 110 based on an assigned location value. The respective probability distribution identified by the deviation calculator 224 can be associated with a similar assigned image location value as the respective image location in each IR image of the image data 216. For example, if the assigned image location value is "2" for the respective image location in each IR image of the image data 216, then the deviation calculator 224 can use this value to identify the respective probability distribution, which has a similar assigned location value, from a number of probability distributions of the anomaly detector model 110. The deviation calculator 224 can further determine a median of the respective probability distribution in response to identifying the respective probability distribution. In some examples, the median of the respective probability distribution can correspond to a median of the fitted CPD for a similar image location identified in an associated MI set of the MI sets 116, as shown in FIG. 1.

The deviation calculator 224 can determine a deviation amount that a MIV deviates from the determined median for the respective image location in each IR image of the image data 216. For example, the deviation calculator 224 can determine a difference between the MIV for the respective image location in each IR image of the image data 216 and the median of the respective probability distribution to determine the deviation amount. In some examples, the deviation calculator 224 can subtract the median of the respective probability distribution from a cumulative density function (CDF) value of the MIV for the respective image location in each IR image of the image data 216 to determine the deviation amount.

The deviation calculator 224 can determine a respective median for each probability distribution of the anomaly detector model 110. The deviation calculator 224 can determine a respective deviation amount for each image location in each IR image based on a difference between the respective median of a corresponding probability distribution and a respective MIV for a given image location in each IR image of the image data 216. The deviation calculator 224 can generate the extremity matrix 226 based on respective determined deviation amounts for corresponding image location in each IR image of the image data 216. In some examples, if the probability distributions of the anomaly detector model 110 are composed of fitted normal distributions, the respective determined deviation amounts can be z-scores.

In some examples, the deviation calculator 224 can further associate or assign an image location value for the respective image location in each IR image of the image data 216 to a corresponding deviation amount of deviation amounts. Thus, in some examples, the extremity matrix 226 can include data or be associated with data that identifies the respective image location in each IR image of the image data 216 for the corresponding deviation amount. For example, a first deviation amount of the extremity matrix 226 can be assigned a similar image location value (e.g., "1") that a first image location in each IR image of the image data 216 is assigned.

The waveguide evaluator 202 further includes a decision function 228 that can process the extremity matrix 226 to determine whether the waveguide 210 can be identified as a conforming or a non-conforming waveguide based on a set of thresholds. The set of thresholds can be a number of standard deviations or a set of numbers indicating acceptable determined deviation values (e.g., acceptable CDF value deviations) from a respective median. A respective threshold number (e.g., 0.49) of deviation amount values can indicate that the waveguide 210 is non-conforming. By way of further example, the decision function 228 can evaluate (e.g., compare) each deviation value (or amount) in the extremity matrix 226 relative to the respective threshold. The decision function 228 can output anomaly data 230 based on the evaluation. For instance, the decision function 228 can output the anomaly data 230 in response to determining that a respective one of the deviation values or a subset of the deviation values is equal to or greater than the respective threshold.

In some examples, a searching algorithm (e.g., a gradient descent function) can be used to find parameter values that minimize an error type, such as a Type II error. The waveguide evaluator 202 or a different module can use the searching algorithm to find threshold values corresponding to the set of thresholds based on an objective, such as minimizing Type II errors. In additional or alternative examples, a searching algorithm can be used to minimize a different error type, such as a Type I error. The waveguide evaluator 202 or the other module can construct a confusion matrix to summarize a performance of the classification algorithm. The confusion matrix can be a 2×2 matrix that shows, from a left to right and top to bottom: a number of nonconforming images classified correctly, a number of conforming images classified as nonconforming (e.g., number of Type I Errors), a number of nonconforming images classified as conforming (e.g., number of of Type II Errors), and a number of nonconforming images classified correctly.

In some examples, the decision function 228 can identify each image location value associated with each deviation value of the extremity matrix 226 that is equal to or greater than a threshold at that image location. The decision function 228 can identify each image location in each IR image of the image data 216 that has a similar image location value that is associated with each deviation value that is equal to or greater than the threshold at that image location. The anomaly data 230 outputted by the decision function 228 can identify each image location in each IR image of the image data 216 having a similar image location value that is associated with each deviation value that is equal to or greater than the threshold. As such, the decision function 228 can generate the anomaly data 230 based on the image data 216 and the extremity matrix 226. The identified image location in each IR image of the image data 216 of the anomaly data 230 can correspond to potential anomaly locations in each IR image of the image data 216 and thus correspond to a potential defect at a respective location on the surface 214 of the waveguide 210.

In some examples, the anomaly data 230 can be rendered on an output device 232 (e.g., a display) to alert a user of the potential anomaly location in each IR image of the image data 216 corresponding to the potential defect at the respective location on the surface 214 of the waveguide 210. In additional examples, the user can inspect the potential defects at each respective location on the surface 214 of the waveguide 210 to determine whether the potential defect is present at each respective location on the surface of the waveguide 210. Thus, the user can visually confirm results (e.g., the anomaly data 230) provided by the waveguide evaluator 202. The user can employ an input device 234 to provider user data indicating whether the waveguide 210 is conforming or non-conforming, and in some instances indicating whether a defect is present at the respective location on the surface 214 of the waveguide 210, for example, as identified by the anomaly data 230. The decision function 228 can adjust (e.g., update) the anomaly detector model 110 based on the user data. For example, the decision function 228 can adjust one or more parameters of the probability distribution to adjust characteristics of the probability distribution. In an example, referred to herein as a "test example," the anomaly data 230 indicates that there is a potential defect at a corresponding location on the surface 214 of the waveguide 210. However, the user confirms that no such defect exists at this location. In the test example, the decision function 228 can adjust an appropriate probability distribution of the anomaly detector model 110 to minimize such false alerts in the future with respect to other waveguides under test.

In some examples, the decision function 228 uses a clustering algorithm on a number of extremity matrices for images of non-conforming waveguides to group the images and thus corresponding extremity matrices based on shared characteristics (i.e., non-conforming signatures). The decision function 228 can interface with a manufacturing execution system (MES) to retrieve or receive serial numbers for the non-conforming waveguides for one or more image groups formed by the clustering algorithm. In some examples, the decision function 228 can receive user data via the input device 234 characterizing correction instructions (e.g., rework instructions for a non-conforming waveguide). In other examples, the MES can provide data characterizing the correction instructions. The correction instructions can be for the one or more non-conforming waveguide images, and can identify each non-conforming waveguide by a respective serial number.

The decision function 228 can associate (e.g., the memory 102, as shown in FIG. 1) each correction instruction with a given image waveguide group based on the respective serial number. For example, a given cluster for a group of non-conforming waveguides can be associated with a given type of correction instruction. Because a cluster or group of non-conforming waveguides share a same correction instruction this grouping also shares characteristics between respective extremity matrices. The decision function 228 can use this relationship to make correction instructions recommendations if similar extremity matrix characteristics are present in a future non-conforming waveguide. In some examples, the correction instruction recommendations can be provided as or part of the anomaly data 230. By way of example, the extremity matrix 226 for the image of the waveguide 210 can be processed by the decision function 228 to determine whether the extremity matrix 226 is similar to a corresponding extremity matrix of one or more clusters of the images of non-conforming waveguides. The decision function 228 can output correction instruction recommendations associated or assigned to a given cluster of the one or more clusters that the extremity matrix 226 is most similar and/or matches.

Accordingly, the waveguide evaluator 202 can be used to determine whether waveguides, such as RF waveguides, during production are conforming or non-conforming. Existing approaches rely on human intervention (e.g., review) of waveguides during production, which bottlenecks an evaluation process and are prone to human error. By including the waveguide evaluator 202 in a waveguide evaluation process during production reduces or in some instances eliminates human error and improves a waveguide production cycle time. The waveguide evaluator 202 employs an anomaly detector model 110 that can be trained based on known conforming waveguides and/or user feedback, which enables the waveguide evaluator 202 to identify anomalous signatures (e.g., indicating a presence of a foreign object of debris (FOD) or some other defect) in a respective waveguide under test.

Image anomaly detection techniques that use machine learning, such as neural networks require a significant amount of training data (e.g., training images) and time to train a neural network for image anomaly detection, as well as resources (e.g., computational resources) for training and use. According to the examples herein, a waveguide evaluator is provided in less time and requires fewer resources (e.g., computational power) than a neural network for image anomaly detection in other existing approaches. Additionally, the waveguide evaluator as described herein does not require a large set of training images as for neural network training. The waveguide evaluator as described herein outperforms existing deep learning methods in terms of performance (e.g., Type II error, precision/recall, and accuracy), interpretability (e.g., model rationale for classification is fully interpretable), and computational speed (e.g., by two orders of magnitude, or better, in some instances.)

Figure 4:
FIG. 4 shows an example of another set of IR images.

FIG. 3 is an example of a set of IR images 300 of surfaces of waveguides, such as conforming waveguides. The set of IR images 300 can define or be part of image data, such as the image data 112, as shown in FIGS. 1 and 2. Thus, reference can be made to the example of FIGS. 1-2 in the example of FIG. 3. The set of IR images 300 include an N number of IR images 302, as shown in FIG. 3. Each of the IR images 302 can be processed by the MIV calculator 114 according to the examples described herein to generate MI sets, such as the MI sets 116, as shown in FIG. 1. For example, the MIV calculator 114 can divide a surface of each IR image of the IR images 302 into an m number of image locations (e.g., m=1 to M). Each image location of the m number of image locations can be of a similar size, as shown in FIG. 3. Each image location in each IR image 302 can be assigned an image location value. For example, an image location 304 in each IR image 302 can be assigned the image location value of "1," as shown in FIG. 3, FIG. 4 is an example of a set of IR images 400 of surfaces of waveguides, such as conforming waveguides. In some examples, the set of IR images 400 is the set of IR images 300, as shown in FIG. 3. Thus, reference can be made to the example of FIGS. 1-3 in the example of FIG. 4. The set of IR images 400 include an N number of IR images 402, as shown in FIG. 4. As described herein, the MIV calculator 114 can group image locations across the IR images 402 that have a similar assigned image location value to define or identify a MI set 404. For example, a first image location assigned a location value of "1" in each IR image 402 can be grouped (e.g., logically linked or associated in the memory 102, as shown in FIG. 1) to define a first MI set 404, as shown in FIG. 4. By way of further example, a second image location assigned a location value of "2" in each IR image 402 can be grouped to define a second MI set 404, as shown in FIG. 4. The MIV calculator 114 can group image locations across IR images of the set of IR images 400 according to assigned locations values to identify an M number of MI sets 404.

By way of further example, the MIV calculator 114 can identify an $m^{th}$ MI set as follows: $\{MIV_{m/1}, MIV_{m/2}, \ldots MIV_{m/n}, \ldots, MIV_{m/N}\}$, wherein $MIV_{m/N}$ is the MIV of the $m^{th}$ location in the $n^{th}$ image. Thus, for example, the first MI set 404 is the MIV at a first image location (identified with a "1" in FIG. 4), the second MI set 404 is the MIV at a second image location (identified with a "2" in FIG. 4), the third MI set 404 is the MIV at a third image location (identified with a "3" in FIG. 4), and the $M^{th}$ MI set is the MIV at an m image location (identified with an "M" in FIG. 4) in each of the IR images 402. Thus, the MIV calculator 114 can represent each MI set (e.g., in the memory 102, as shown in FIG. 1) for the IR images 402 as an array of mean pixel intensity values at a particular subset of pixels across a set of conforming IR images as follows:

$$1^{st} MI \text{ set} = \left\{ MIV_{\underset{1}{1}}, MIV_{\underset{2}{1}} \ldots, MIV_{\underset{n}{1}} \ldots, MIV_{\underset{N}{1}} \right\};$$

$$2^{nd} MI \text{ set} = \left\{ MIV_{\underset{1}{2}}, MIV_{\underset{2}{2}} \ldots, MIV_{\underset{n}{2}} \ldots, MIV_{\underset{N}{2}} \right\};$$

$$3^{rd} MI \text{ set} = \left\{ MIV_{\underset{1}{3}}, MIV_{\underset{2}{3}} \ldots, MIV_{\underset{n}{3}} \ldots, MIV_{\underset{N}{3}} \right\}; \text{ and}$$

$$m^{th} MI \text{ set} = \left\{ MIV_{\underset{1}{M}}, MIV_{\underset{2}{M}} \ldots, MIV_{\underset{n}{M}} \ldots, MIV_{\underset{N}{M}} \right\}.$$

Figure 5:
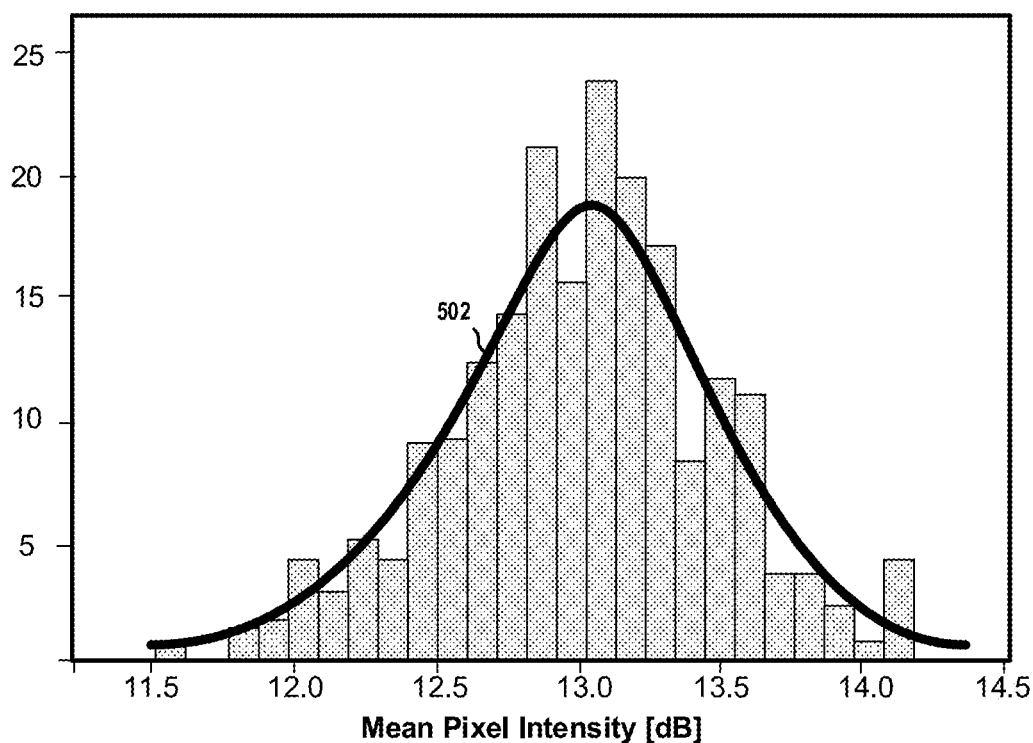
FIG. 5 is an example graph of a continuous probability distribution (CPD) fitted with a respective mean intensity (MI) set.

FIG. 5 is an example of a graph 500 of a CPD 502 fitted with a respective MI set, for example, the $M^{th}$ MI set 404, as shown in FIG. 4. Thus, reference can be made to the example of FIGS. 1-4 in the example of FIG. 5. As shown in the example of FIG. 5, a vertical axis of the graph 500 represents a number of conforming waveguides and a horizontal axis of the graph 500 represents mean pixel intensity values in dB. In the example of FIG. 5, the graph 500 includes a number of rectangles (e.g., shaded rectangles), and each rectangle represents a range (width) and frequency (height) of MIVs across a number of IR images for an $m^{th}$ MI set.

Figure 6:
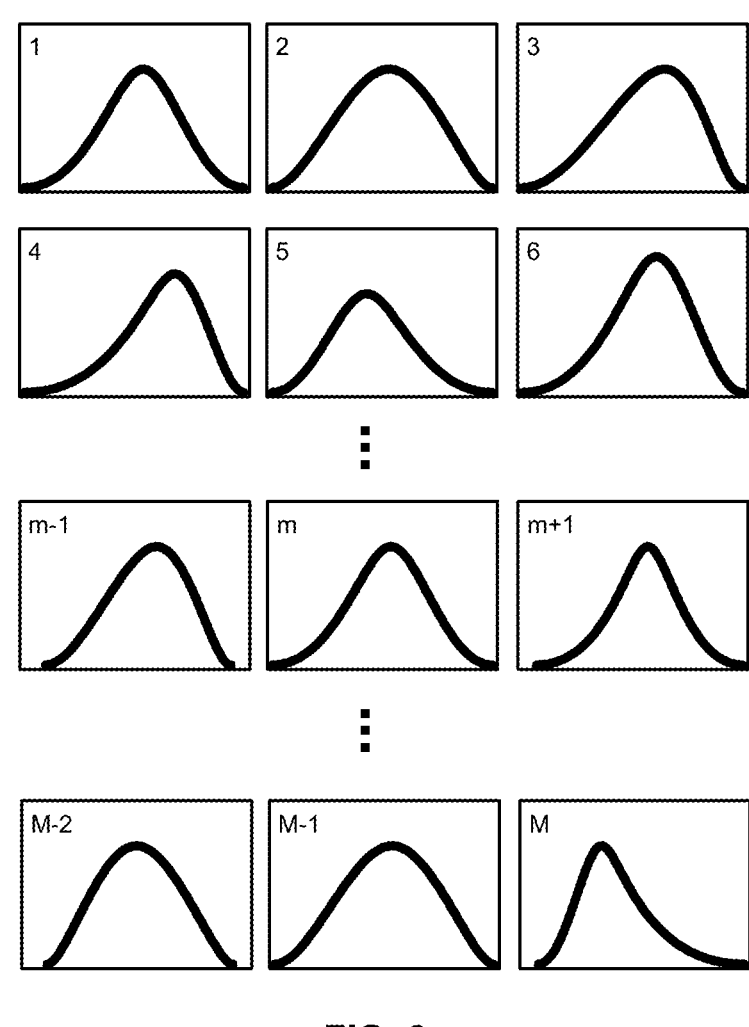
FIG. 6 shows examples of CPDs fitted for respective MI sets.

FIG. 6 is an example of an M number of CPDs fitted for an M number of MI sets. As shown in the example of FIG. 6, each CPD can be fitted with a respective MI set of the M number of MI sets, such as the $m^{th}$ MI set, as shown in FIG. 5. Thus, reference can be made to the example of FIGS. 1-5 in the example of FIG. 6. Each CPD can be identified by a respective CPD value, as shown in FIG. 6. For example, a first CPD fitted for a first MI set is identified in the example of FIG. 6 with a "1" whereas a six CPD fitted for a sixth MI set is identified in the example of FIG. 6 with a "6." In some examples, CPD values can correspond to image location values, such as described herein.

Figure 7:
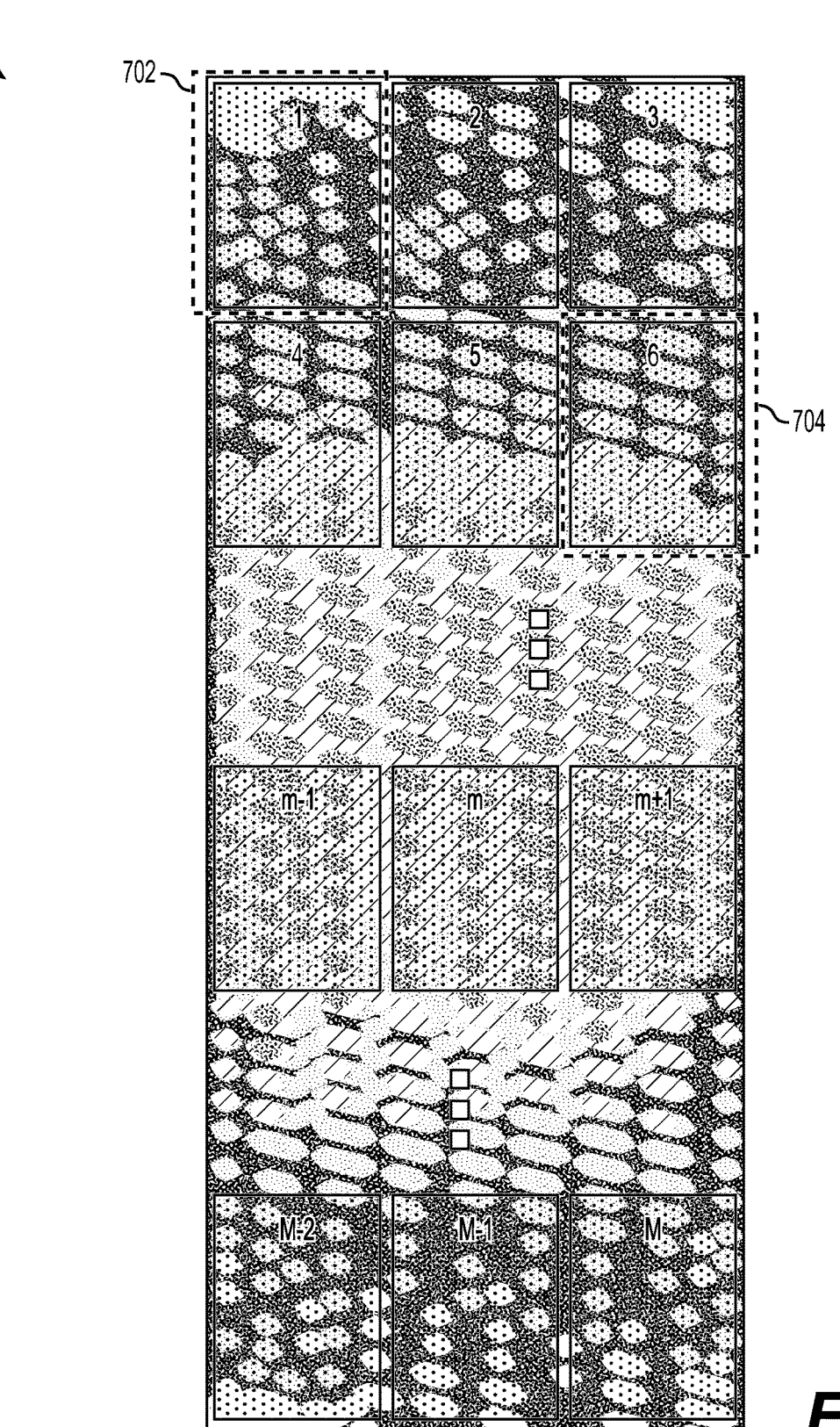
FIG. 7 shows an example of an image of a surface of a waveguide under test.

FIG. 7 is an example of an IR image 700 of a surface of a waveguide, for example, during waveguide screening for non-conforming waveguides, such as on a production line, as described herein with respect to the example of FIG. 2. Thus, reference can be made to the example of FIG. 2 in the example of FIG. 7. The IR image 700 can be part of image data, such as the image data 216, as shown in FIG. 2. The IR image 700 can be processed by the MIV calculator 220 according to the examples described herein. For example, the MIV calculator 220 can divide the surface of the IR image 700 into a number of image locations. Each image location of the number of image locations can be of a similar size. Each image location in the IR image 700 can be assigned an image location value in a same or similar manner as described herein. For example, a first image location 702 in the IR image 700 can be assigned a location value of "1" and a sixth image location 704 in the IR image 700 can be assigned a location value of "6", as shown in FIG. 7.

Figure 8:
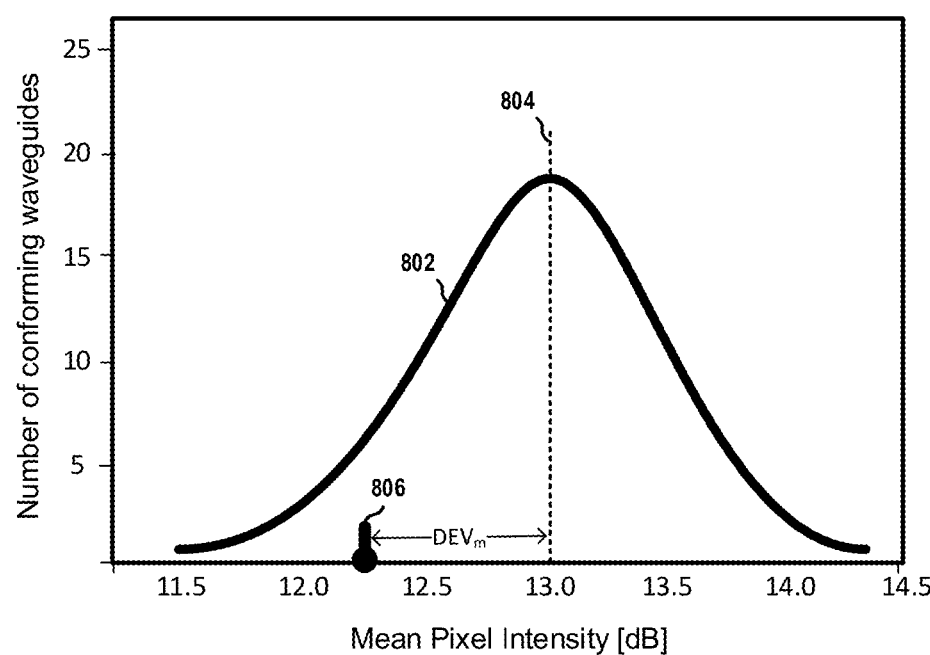
FIG. 8 is an example graph of a CPD fitted with a respective MI set for a waveguide under test.

FIG. 8 is an example of a graph 800 of a CPD 802 fitted with a respective MI set, for example, a MI set of the MI sets 116, as shown in FIG. 1, according to the examples described herein. The CPD 802 can be representative of a probability distribution, such as described herein, and thus can correspond to one of the probability distributions of the anomaly detector model 110, as shown in FIGS. 1 and 2. Thus, reference can be made to the example of FIGS. 1-7 in the example of FIG. 8. As shown in the example of FIG. 8, a vertical axis of the graph 800 represents a number of conforming waveguides and a horizontal axis of the graph 800 represents mean pixel intensity values in dB. As described herein, the deviation calculator 224 can process each probability distribution (e.g., CPD) to determine a median for a respective probability distribution. The deviation calculator 224, as described herein, use the determined median to determine a deviation amount that a MIV for a respective image location in each IR image of the image data 216 deviates from the determined median for generation of the extremity matrix 226, as shown in FIG. 2.

For example, the deviation calculator 224 can identify the CPD 802 from a number of CPDs of the anomaly detector model 110 in response to determining that an assigned image location value (e.g., "2") matches an assigned image location value (e.g., "2") for an m image location in each IR image of the image data 216. The deviation calculator 224 can determine a median 804 of the CPD 802, as shown in FIG. 8, according to the examples described herein. The deviation calculator 224 can determine a deviation amount (identified as "$DEV_m$" in FIG. 8) that a MIV (identified at 806 in FIG. 8) deviates from the median 804 for an m image location in each IR image of the image data 216. The deviation calculator 224 can store the determined deviation amount for each image location in each IR image of the image data 216 in the extremity matrix 226.

By way of further example, if the respective image location is a first image location in each IR image of the image data 216, the deviation calculator 224 can determine a first deviation amount ($DEV_1$) by subtracting a first determined median ($median_1$) for a first CPD from a first MIV of the first image location in each IR image of the image data 216. The deviation calculator 224 can determine a second deviation amount ($DEV_2$) by subtracting a second determined median ($median_2$) for a second CPD from a second MIV of a second image location in each IR image of the image data 216. As a further example, the deviation calculator 224 can determine a third deviation amount ($DEV_3$) by subtracting a third determined median ($median_3$) for a third CPD from a third MIV of a third image location in each IR image of the image data 216. The deviation calculator 224 can determine a deviation amount ($DEV_M$) for each image location in each IR image of the image data 216 and provide the extremity matrix 226 based on the determined deviation amounts.

Figure 9:
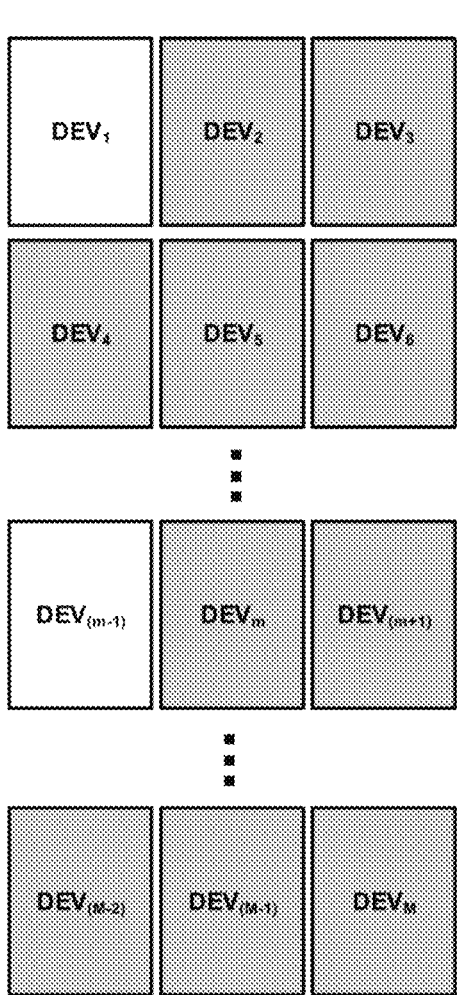
FIG. 9 depicts an example of an extremity matrix.

FIG. 9 is a graphical example of an extremity matrix 900 outputted by the deviation calculator 224, as shown in FIG. 2. Thus, reference can be made to the example of FIGS. 1-8 in the example of FIG. 9. In some instances, the extremity matrix 900 is the extremity matrix 226, as shown in FIG. 2. The extremity matrix 900 includes a respective deviation amount $DEV_1$ to $DEV_M$ for corresponding image locations in each IR image of the image data 216, as shown in FIG. 2. As described herein, the decision function 228, as shown in FIG. 2, can process the extremity matrix 900 to determine whether a corresponding waveguide (e.g., the waveguide 210, as shown in FIG. 2) should be identified or labelled as a conforming or a non-conforming waveguide based on a set of thresholds. Thus, the extremity matrix 900 can be processed by the decision function 228 to determine whether the corresponding waveguide has surface defects.

In view of the foregoing structural and functional features described above, example methods will be better appreciated with reference to FIGS. 10-11. While, for purposes of simplicity of explanation, the example methods of FIG. 10-11 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods.

FIG. 10 is an example of a method 1000 for generating an anomaly detector model, such as the anomaly detector model 110, as shown in FIGS. 1-2. Thus, reference be made to the example of FIGS. 1-2 in the example of FIG. 10. At least some of the steps of the method 1000 can be implemented by the image anomaly modeling tool 108, as shown in FIG. 1. The method 1000 can begin at 1002 by providing an RF signal (e.g., the RF test signal 208, as shown in FIG. 2) into a conforming waveguide. At 1004, obtaining (e.g., by the IR sensor 212, as shown FIG. 2) one or more IR images of the conforming waveguide. The one or more images can form or be part of the image data 112, as shown in FIG. 1. The one or more images can be surface images of the conforming waveguide.

At 1006, computing (e.g., by the MIV calculator 114, as shown in FIG. 1) a MIV of pixels of each image location in the one or more images. At 1008, repeating steps 1002-1006 for a number of conforming waveguides to compute a corresponding MIV of pixels of each image location in the one or more images of the conforming waveguides. At 1010, producing (e.g., by the MIV calculator 114) a number of MI sets (e.g., the MI sets 116, as shown in FIG. 1) based on respective image location values for image locations across the one or more images of the conforming waveguides. At 1012, computing (e.g., by the image anomaly model generator 118, as shown in FIG. 1) a respective probability distribution (e.g., CPD) based on a respective MI set of the MI sets to provide a number of probability distributions.

In some examples, the method 1000 can include at 1012, tuning (e.g., by the image anomaly model generator 118) parameters (e.g., hyper parameters) of a distribution to best fit the distribution to the respective MI set to provide the respective probability distribution. In additional or alternative examples, the method 1000 can include at 1012, applying (e.g., by the image anomaly model generator 118) a mask to exclude at least one probability distribution of the probability distributions. In some examples, the mask can be weighted so that the at least one probability distribution is given greater or less consideration. In some examples, the method 1000 includes, at 1014, providing (e.g., via the image anomaly model generator 118) an anomaly detector model (e.g., the anomaly detector model 110, as shown in FIG. 1) that includes each computed respective probability distribution.

FIG. 11 is an example of a method 1100 for determining whether a waveguide is a conforming or a non-conforming waveguide and updating the anomaly detector model, such as the anomaly detector model 110, as shown in FIGS. 1-2. Thus, reference be made to the example of FIGS. 1-2 in the example of FIG. 11. In some examples, the anomaly detector model can be generated according to the method of 1000, as shown in FIG. 10. Thus, in some instances, the method 1100 can include the method 1000 of FIG. 10.

The method 1100 can begin at 1102 by providing an RF signal (e.g., the RF test signal 208, as shown in FIG. 2) into a waveguide under test (e.g., the waveguide 210, as shown in FIG. 1). At 1104, obtaining (e.g., by the IR sensor 212, as shown FIG. 2) one or more IR images of the waveguide under test. The one or more images can part of the image data 216, as shown in FIG. 2. The one or more images can be surface images of the waveguide under test. At 1106, computing (e.g., by the MIV calculator 114, as shown in FIG. 1, or the MIV calculator 220, as shown in FIG. 2) a MIV of pixels of a number of image locations in the one or more images of the waveguide under test.

At 1108, generating (e.g., by the deviation calculator 224, as shown in FIG. 2) an extremity matrix (e.g., the extremity matrix 226, as shown in FIG. 2) based on the anomaly detector model and MIV pixel data (e.g., the MIV pixel data 222, as shown in FIG. 2) that includes MIVs for corresponding image locations in the one or more images of the waveguide under test. The extremity matrix can include a number of deviation values, each corresponding to a deviation of one of the MIVs for corresponding image locations in the one or more images of the waveguide under test from a median of a corresponding probability distribution (e.g., fitted CPD) of the anomaly detector model. At 1110, determining (e.g., by the decision function 228, as shown in FIG. 2) whether the waveguide under test is a conforming or non-conforming waveguide based on the extremity matrix and a set of thresholds. In some examples, the method 1100 further includes, at 1112, receiving user data (e.g., by the input device 234, as shown in FIG. 2) indicating whether the waveguide under test is a conforming or non-conforming waveguide. At 1114, adjusting (e.g., by the decision function 228, as shown in FIG. 2) the anomaly detector model based on the user data. For example, the adjusting, at 1114, can include updating one or more probability distributions of the anomaly detector model to provide an updated anomaly detector model (e.g., for future waveguides to be tested for defects).

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 12. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signal per se).

As an example and not by way of limitation, a computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 12:
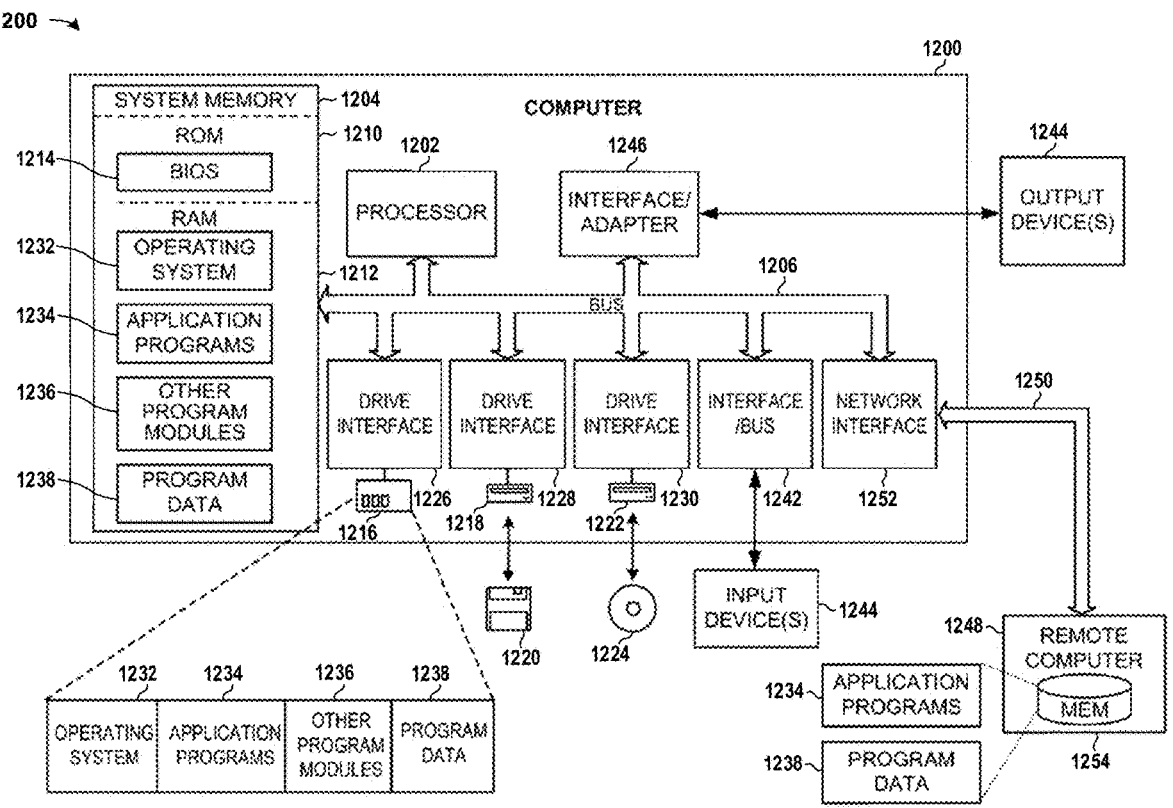
FIG. 12 depicts an example computing environment that can be used to perform methods according to an aspect of the present disclosure.

In this regard, FIG. 12 illustrates one example of a computer system 1200 that can be employed to execute one or more embodiments of the present disclosure. Computer system 1200 can be implemented on one or more general purpose networked computer systems, embedded computer systems, routers, switches, server devices, client devices, various intermediate devices/nodes or standalone computer systems. Additionally, computer system 1200 can be implemented on various mobile clients such as, for example, a personal digital assistant (PDA), laptop computer, pager, and the like, provided it includes sufficient processing capabilities.

Computer system 1200 includes processing unit 1202, system memory 1204, and system bus 1206 that couples various system components, including the system memory 1204, to processing unit 1202. Dual microprocessors and other multi-processor architectures also can be used as processing unit 1202. System bus 1206 may be any of several types of bus structure including a memory bus or memory controller, a peripheral bus, and a local bus using any of a variety of bus architectures. System memory 1204 includes read only memory (ROM) 1210 and random access memory (RAM) 1212. A basic input/output system (BIOS) 1214 can reside in ROM 1210 containing the basic routines that help to transfer information among elements within computer system 1200.

Computer system 1200 can include a hard disk drive 1216, magnetic disk drive 1218, e.g., to read from or write to removable disk 1220, and an optical disk drive 1222, e.g., for reading CD-ROM disk 1224 or to read from or write to other optical media. Hard disk drive 1216, magnetic disk drive 1218, and optical disk drive 1222 are connected to system bus 1206 by a hard disk drive interface 1226, a magnetic disk drive interface 1228, and an optical drive interface 1230, respectively. The drives and associated computer-readable media provide nonvolatile storage of data, data structures, and computer-executable instructions for computer system 1200. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 1210, including operating system 1232, one or more application programs 1234, other program modules 1236, and program data 1238. In some examples, the application programs 1234 can include image anomaly modeling tool 108, as shown in FIG. 1, and/or the waveguide evaluator 202, as shown in FIG. 2. The application programs 1234 and program data 1238 can include functions and methods programmed for image anomaly model generation and/or image anomaly model detection, as described herein.

A user may enter commands and information into computer system 1200 through one or more input devices 1240, such as a pointing device (e.g., a mouse, touch screen), keyboard, microphone, joystick, game pad, scanner, and the like. In some examples, the input devices 1240 include the input device 234, as shown in FIG. 2. These and other input devices are often connected to processing unit 1202 through a corresponding port interface 1242 that is coupled to the system bus, but may be connected by other interfaces, such as a parallel port, serial port, or universal serial bus (USB). One or more output devices 1244 (e.g., display, a monitor, printer, projector, or other type of displaying device) is also connected to system bus 1206 via interface 1246, such as a video adapter. In some examples, the one or more output devices 1244 include the output device 232, as shown in FIG. 2.

Computer system 1200 may operate in a networked environment using logical connections to one or more remote computers, such as remote computer 1248. Remote computer 1248 may be a workstation, computer system, router, peer device, or other common network node, and typically includes many or all the elements described relative to computer system 1200. The logical connections, schematically indicated at 1250, can include a local area network (LAN) and a wide area network (WAN). When used in a LAN networking environment, computer system 1200 can be connected to the local network through a network interface or adapter 1252. When used in a WAN networking environment, computer system 1200 can include a modem, or can be connected to a communications server on the LAN. The modem, which may be internal or external, can be connected to system bus 1206 via an appropriate port interface. In a networked environment, application programs

1234 or program data 1238 depicted relative to computer system 1200, or portions thereof, may be stored in a remote memory storage device 1254.

ADDITIONAL EMBODIMENTS

The present disclosure is also directed to the following exemplary embodiments:

Embodiment 1: A computer-implemented method comprising receiving image data comprising one or more images of a waveguide; computing a statistical value of pixels of a number of image locations in the one or more images of the waveguide; generating an extremity matrix based on an anomaly detector model and statistical pixel data that includes statistical values computed for respective image locations in the one or more images of the waveguide; and determining whether the waveguide is a conforming or a non-conforming waveguide based on the extremity matrix and a set of thresholds.

Embodiment 2: The computer-implemented method of embodiment 1, wherein the anomaly detector model comprises a number of probability distributions, each probability distribution being computed based on a respective statistical set of statistical sets, wherein each statistical set of the statistical sets identifies a respective image location of a number of image locations across one or more images of a number of conforming waveguides, and a statistical value for the respective image location.

Embodiment 3: The computer-implemented method of embodiment 2, further comprising fitting a distribution to each of the statistical sets to provide one of the probability distributions of the anomaly detector model.

Embodiment 4: The computer-implemented method of embodiment 3, wherein the distribution is a continuous probability distribution.

Embodiment 5: The computer-implemented method of any of embodiments 2-4, wherein the extremity matrix includes a number of deviation values, each deviation value corresponding to a deviation of one of the statistical values for the respective image locations in the one or more images of the waveguide from a median of a corresponding probability distribution of the probability distributions of the anomaly detector model.

Embodiment 6: The computer-implemented method of embodiment 5, wherein determining whether the waveguide is a conforming or a non-conforming waveguide comprises evaluating each deviation value of the extremity matrix relative to the set of thresholds.

Embodiment 7: The computer-implemented method of embodiment 6, further comprising outputting anomaly data indicating that the waveguide is a conforming or non-conforming waveguide based on the evaluation.

Embodiment 8: The computer-implemented method of embodiment 7, wherein the anomaly data identifies one or more image locations in the one or more images of the waveguide corresponding to a potential image anomaly location, the potential image anomaly location being indicative of a potential defect at a respective location on the waveguide.

Embodiment 9: The computer-implemented method of any of embodiments 1-8, further comprising: receiving user data indicating whether a defect is present at the respective location; and updating the anomaly detector model based on the user data.

Embodiment 10: The computer-implemented method of embodiment 9, wherein updating the anomaly detector model based on the user data comprises adjusting one or more parameters of at least one probability distribution of the probability distributions of the anomaly detector model.

Embodiment 11: The computer-implemented method of any of embodiments 1-10, wherein the one more images of the waveguide are one or more IR images, the method further comprising processing the image data to convert color pixels of the one or more IR images of the image data to a matrix of RF amplitude values, the statistical value of the pixels being computed based on the matrix of RF amplitude values.

Embodiment 12: A system comprising: memory to store machine-readable instructions and data comprising an anomaly detector model comprising pre-computed probability distributions, and one or more processors to access the memory and execute the machine-readable instructions. The machine-readable instructions can include a statistical calculator programmed to compute a statistical value of pixels of each image location in one or more images of a waveguide, a deviation calculator programmed to generating an extremity matrix based on an evaluation of the statistical value of the pixels of each image location in the one or more images of the waveguide and a respective one of the pre-computed probability distributions; and a decision function programmed to determine whether the waveguide is a conforming or a non-conforming waveguide based on the extremity matrix and a set of thresholds.

Embodiment 13: The system of embodiment 12, wherein the extremity matrix includes a number of deviation values, each deviation value corresponding to a deviation of one of statistical values for respective image locations in the one or more images of the waveguide from a median of a corresponding pre-computed probability distribution of the pre-computed probability distributions of the anomaly detector model.

Embodiment 14: The system of embodiment 13, wherein the decision function is further programmed to evaluate each deviation value of the extremity matrix relative to the set of thresholds and output anomaly data indicating that the waveguide is a conforming or non-conforming waveguide based on the evaluation of deviation values of the extremity matrix relative to the set of thresholds.

Embodiment 15: The system of embodiment 14, wherein the anomaly data identifies one or more image locations in the one or more images of the waveguide corresponding to a potential image anomaly location, the potential image anomaly location being indicative of a potential defect at a respective location on the waveguide, the decision function being further programmed to receive user data indicating whether a defect is present at the respective location, and update the anomaly detector model based on the user data.

Embodiment 16: The system of embodiment 15, wherein updating the anomaly detector model based on the user data comprises adjusting one or more parameters of at least one pre-computed probability distribution of the pre-computed probability distributions of the anomaly detector model.

Embodiment 17: The system of any embodiments 12-16, wherein the one more images of the waveguide are one or more IR images and the waveguide is an RF waveguide.

Embodiment 18: A computer-implemented method comprising: receiving one or more images of a conforming electronic device, computing a MIV of pixels of each image location in the one or more images of the conforming electronic device; repeating the receiving and the computing step for a number of conforming electronic devices to compute respective MIVs of pixels of image locations in one or more images of the conforming electronic devices; generating MI sets based on respective image location values for the image locations across the one or more images of the conforming electronic devices; and computing a respective probability distribution based on a respective MI set of the MI sets to provide probability distributions to form an anomaly detector model for detecting potential defects in one or more electronic devices.

Embodiment 19: The computer-implemented method of embodiment 18, wherein the one or more images are IR images of a surface of a respective electronic device.

Embodiment 20: The computer-implemented method of embodiment 19, wherein the respective electronic device is a waveguide, and the method further comprises determining whether a waveguide under test is a conforming or a non-conforming waveguide based on an extremity matrix and a set of thresholds, the extremity matrix being calculated based on the anomaly detector model and further based on MIV pixel data comprising MIVs of pixels of respective image locations in one or more IR images of the waveguide under test.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

As used herein, the term "or" is intended to be inclusive, rather than exclusive. Unless specified otherwise, "X employs A or B" is intended to mean any of the natural incisive permutations. That is, if X employs A; X employs B; or X employs both A and B, the "X employs A or B" is satisfied. Additionally, the articles "a" or "an" should generally be construed to mean, unless otherwise specified, "one or more" of the respective noun. As used herein, the terms "example" and/or "exemplary" are utilized to delineate one or more features as an example, instance, or illustration. The subject matter described herein is not limited by such examples. Additionally, any aspects, features, and/or designs described herein as an "example" or as "exemplary" are not necessarily intended to be construed as preferred or advantageous. Likewise, any aspects, features, and/or designs described herein as an "example" or as "exemplary" is not meant to preclude equivalent embodiments (e.g., features, structures, and/or methodologies) known to one of ordinary skill in the art.

Understanding that is not possible to describe each and every conceivable combination of the various features (e.g., components, products, and/or methods) described herein, one of ordinary skill in the art can recognize that many further combinations and permutations of the various embodiments described herein are possible and envisaged. Furthermore, as used herein, the terms "includes," "has,"

"possesses," and/or the like are intended to be inclusive in a manner similar to the term "comprising" as interpreted when employed as a transitional word in a claim.

What have been described above are examples. It is, of course, not possible to describe every conceivable combination of components or methods, but one of ordinary skill in the art will recognize that many further combinations and permutations are possible. Accordingly, the present disclosure is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on."

The invention claimed is:

1. A computer-implemented method carried out with one or more processors comprising:
  receiving image data from an infra-red (IR) sensor in response to injecting a radio frequency test signal into a waveguide under test, the image data comprising one or more images of the waveguide under test;
  computing, using a processor, a statistical value of pixels of a number of image locations in the one or more images of the waveguide;
  generating, using a processor, an extremity matrix based on an anomaly detector model and statistical pixel data that includes statistical values computed for respective image locations in the one or more images of the waveguide; and
  determining, using a processor, whether the waveguide is a conforming or a non-conforming waveguide based on the extremity matrix and a set of thresholds.

2. The computer-implemented method of claim 1, wherein the anomaly detector model comprises a number of probability distributions, each probability distribution being computed based on a respective statistical set of statistical sets, wherein each statistical set of the statistical sets identifies a respective image location of a number of image locations across one or more images of a number of conforming waveguides, and a statistical value for the respective image location.

3. The computer-implemented method of claim 2, further comprising fitting a distribution to each of the statistical sets to provide one of the probability distributions of the anomaly detector model.

4. The computer-implemented method of claim 3, wherein the distribution is a continuous probability distribution.

5. The computer-implemented method of claim 2, wherein the extremity matrix includes a number of deviation values, each deviation value corresponding to a deviation of one of the statistical values for the respective image locations in the one or more images of the waveguide from a median or an average of a corresponding probability distribution of the probability distributions of the anomaly detector model.

6. The computer-implemented method of claim 5, wherein determining whether the waveguide is a conforming or a non-conforming waveguide comprises evaluating each deviation value of the extremity matrix relative to the set of thresholds.

7. The computer-implemented method of claim 6, further comprising outputting anomaly data indicating that the waveguide is a conforming or non-conforming waveguide based on the evaluation.

8. The computer-implemented method of claim 7, wherein the anomaly data identifies one or more image locations in the one or more images of the waveguide corresponding to a potential image anomaly location, the potential image anomaly location being indicative of a potential defect at a respective location on the waveguide.

9. The computer-implemented method of claim 8, further comprising:
  receiving user data indicating whether a defect is present at the respective location; and
  updating the anomaly detector model based on the user data.

10. The computer-implemented method of claim 9, wherein updating the anomaly detector model based on the user data comprises adjusting one or more parameters of at least one probability distribution of the probability distributions of the anomaly detector model.

11. The computer-implemented method of claim 1, wherein the one or more images of the waveguide are one or more infrared (IR) images, the method further comprising processing the image data to convert color pixels of the one or more IR images of the image data to a matrix of radio-frequency (RF) amplitude values, the statistical value of the pixels being computed based on the matrix of RF amplitude values.

12. A system comprising:
  memory to store machine-readable instructions and data comprising an anomaly detector model comprising pre-computed probability distributions;
  one or more processors to access the memory and execute the machine-readable instructions, the machine-readable instructions comprising:
    a statistical value calculator programmed to compute a statistical value of pixels of each image location in one or more images of a waveguide under test, wherein the one or more images are received in response to injection of one or more radio frequency (RF) signals into the waveguide under test;
    a deviation calculator programmed to generating an extremity matrix based on an evaluation of the statistical value of the pixels of each image location in the one or more images of the waveguide and a respective one of the pre-computed probability distributions, wherein the extremity matrix includes a number of deviation values; and
    a decision function programmed to determine whether the waveguide is a conforming or a non-conforming waveguide based on the deviation values of the extremity matrix and relative to a set of thresholds.

13. The system of claim 12, each deviation value corresponding to a deviation of one of statistical values for respective image locations in the one or more images of the waveguide from a median of a corresponding pre-computed probability distribution of the pre-computed probability distributions of the anomaly detector model.

14. The system of claim 13, wherein the decision function is further programmed evaluate each deviation value of the extremity matrix relative to the set of thresholds and output anomaly data indicating that the waveguide is a conforming or non-conforming waveguide based on the evaluation of deviation values of the extremity matrix relative to the set of thresholds.

15. The system of claim 14, wherein the anomaly data identifies one or more image locations in the one or more images of the waveguide corresponding to a potential image anomaly location, the potential image anomaly location being indicative of a potential defect at a respective location on the waveguide, the decision function being further programmed to receive user data indicating whether a defect is present at the respective location, and update the anomaly detector model based on the user data.

16. The system of claim 15, wherein updating the anomaly detector model based on the user data comprises adjusting one or more parameters of at least one pre-computed probability distribution of the pre-computed probability distributions of the anomaly detector model.

17. The system of claim 16, wherein the one more images of the waveguide are one or more infrared (IR) images and the waveguide is a radio-frequency (RF) waveguide.

18. A system comprising:

a waveguide under test;

an infra-red (IR) sensor for generating image data, the image data comprising one or more images of the waveguide under test;

a test driver for injecting the waveguide under test with one or more radio frequency signals;

memory to store machine-readable instructions and data comprising an anomaly detector model comprising pre-computed probability distributions;

one or more processors to access the memory and execute the machine-readable instructions, the machine-readable instructions comprising:

a statistical value calculator programmed to compute a statistical value of pixels of each image location in the one or more images of the waveguide under test, wherein the one or more images are received by the IR sensor in response to injection of the one or more RF signals into the waveguide under test;

a deviation calculator programmed to generating an extremity matrix based on an evaluation of the statistical value of the pixels of each image location in the one or more images of the waveguide and a respective one of the pre-computed probability distributions, wherein the extremity matrix includes a number of deviation values; and a decision function programmed to determine whether the waveguide is a conforming or a non-conforming waveguide based on the deviation values of the extremity matrix relative to a set of thresholds.

19. The system of claim 18, wherein the one more images of the waveguide are one or more infrared (IR) images, the method further comprising processing the image data to convert color pixels of the one or more IR images of the image data to a matrix of radio-frequency (RF) amplitude values, the statistical value of the pixels being computed based on the matrix of RF amplitude values.

20. The system of claim 18, wherein each deviation value corresponding to a deviation of one of statistical values for respective image locations in the one or more images of the waveguide under test from a median of a corresponding pre-computed probability distribution of the pre-computed probability distributions of the anomaly detector model.

\* \* \* \* \*